United States Patent
Murry et al.

(10) Patent No.: US 8,126,329 B2
(45) Date of Patent: Feb. 28, 2012

(54) QUAD-PORT OPTICAL MODULE WITH PASS-THROUGH AND ADD/DROP CONFIGURATION

(75) Inventors: Stefan J. Murry, Houston, TX (US); Zulfikar Morbi, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 793 days.

(21) Appl. No.: 12/203,602

(22) Filed: Sep. 3, 2008

(65) Prior Publication Data

US 2010/0054751 A1    Mar. 4, 2010

(51) Int. Cl.
*H04J 14/02* (2006.01)
*H04B 10/00* (2006.01)

(52) U.S. Cl. .............. 398/83; 398/130; 398/79; 398/85; 398/89; 398/99; 398/135; 398/140; 455/73

(58) Field of Classification Search .............. 398/42, 398/68, 78, 79, 82, 83, 85, 87, 89, 99, 100, 398/130, 135, 137, 139, 140, 162, 182, 202, 398/212–214; 385/24, 127, 147; 725/74, 725/80, 141
See application file for complete search history.

(56) References Cited

U.S. PATENT DOCUMENTS

| 5,457,558 | A  | * | 10/1995 | Yokoyama | 398/181 |
| 6,091,869 | A  | * | 7/2000  | Sundelin | 385/24  |
| 6,310,994 | B1 | * | 10/2001 | Jones et al. | 385/24 |
| 6,445,472 | B1 |   | 9/2002  | Kim et al. |  |
| 6,975,797 | B2 | * | 12/2005 | Chen et al. | 385/48 |

FOREIGN PATENT DOCUMENTS

WO    WO2007/139316    12/2007

* cited by examiner

*Primary Examiner* — Loha Ben
(74) *Attorney, Agent, or Firm* — Grossman Tucker Perreault & Pfleger, PLLC; Norman S. Kinsella

(57) ABSTRACT

Techniques are disclosed for providing bi-directional data services involving a plurality of wavelengths. The data services may be hybrid in nature, including both digital and analog data signals. The techniques may be implemented, for instance, in an optical module, and allow one or more wavelengths to pass-through while other wavelengths are terminated or otherwise diverted. In one example embodiment, the techniques are embodied in a quad-port optical module having two input/output (I/O) ports and pass-through capability for at least one of the wavelengths, add capability for at least one wavelength, and drop capability for at least one wavelength. The module may further include transmit and/or receive capability for one or more signal types. The module can be operatively coupled with a bidi device or other suitable transceiver, to provide modular transmit-receive capability for a desired signal type.

20 Claims, 3 Drawing Sheets

QUAD-PORT OPTICAL MODULE WITH PASS-THROUGH AND ADD/DROP CONFIGURATION

FIELD OF THE INVENTION

The present disclosure relates to optical communication systems, and more particularly, to a quad-port, multi-frequency optical module having pass-through capability.

BACKGROUND

Generally, networks for transmission of voice, data, and video to and from subscribers fall into two main types: ones in which information is encoded in digital format (i.e., electrical or optical signals that represent ones and zeros) and others where the information is encoded as an analog signal (e.g., a video-transmission network such as is used by cable television operators). Recently, service providers have indicated a desire to converge these services. That is, companies that usually offer digital services (like telephone calls or Internet access) would like to offer analog services (such as television programming). Similarly, companies that have traditionally offered analog services (like cable television) would like to more effectively offer data services (Internet access and the like).

Many of these providers (both analog and digital) have constructed fiber-optic networks for carrying their respective services. These fiber optic networks may carry information in digital or analog format. For example, a laser diode may be rapidly turned "on" and "off" (i.e., brighter and darker) to represent ones and zeros for digital transmission, or a laser diode may transmit signals in analog format by modulating its brightness to correspond to that of a desired analog signal (such as one or more TV channels).

In any such cases, it is generally desirable to transmit data both "upstream" and "downstream" over these fiber networks. For example, when accessing the Internet it is necessary to both transmit requests for web content upstream from the subscriber to the service provider central office, and to receive web content sent downstream from the provider's central office to the subscriber. In the context of cable television, subscribers can send a request, for example, for a certain movie (e.g., pay-per-view), where the request is sent upstream from the subscriber's set-top box to the cable television (CATV) office. The subscriber then receives the requested movie content, which is sent downstream from the CATV office to the subscriber's set-top box, so that it can be displayed on a local television.

In order to facilitate this communication between subscribers and providers, various devices are available. For instance, "duplex" optical devices are designed to transmit and receive data over two separate optical fibers. Such duplex devices have dedicated or unidirectional optical ports, where one of the ports and its respective fiber are for reception (e.g., downstream communications) and the other port and its respective fiber are for transmission (e.g., upstream communications).

Another typical optical device is capable of true bidirectional transmission, where the same fiber carries information in both upstream and downstream directions, with each direction carrying information in a different wavelength. Such a bidirectional device, sometimes referred to as "bidi", is generally implemented with a combination of optical components, typically including laser diodes as transmitters, photodiodes as receivers, and one or more partially transmissive or reflective elements that ensure the various optical signals are selectively routed to or from their intended transmitters or receivers. Conventional bidi devices include a single optical input/output port and one or more electrical ports for either receiving (e.g., via a photodiode) or transmitting (e.g., via a laser diode). Such conventional bidi designs are typically available in the form of diplexers and triplexers.

SUMMARY OF THE INVENTION

One embodiment of the present invention provides a quad-port optical device. The device includes a first input/output (I/O) port for receiving a first optical signal having a first wavelength, and for receiving a second optical signal having a second wavelength. The device further includes a second I/O port, and a first filter operatively coupled between the first and second I/O ports, for allowing the first optical signal to pass-through substantially without reflection to the second I/O port, and for reflecting the second optical signal. The device further includes a receiver (e.g., photodiode or other suitable light detector) for converting the reflected second optical signal to a first electrical signal, and a drop port for outputting the first electrical signal. In one particular such case, the second I/O port is for receiving a third optical signal having a third wavelength, and the first filter is further configured for allowing the third optical signal to pass-through substantially without reflection to the first I/O port. In another particular case, the device includes an add port for receiving a second electrical signal, and a transmitter (e.g., laser diode or other suitable light source) for generating a fourth optical signal having a fourth wavelength based on the second electrical signal, wherein the fourth optical signal reflects off the first filter and is provided to the first I/O port. In one such case, the device further includes a second filter operatively coupled between the first filter and the transmitter, for allowing the fourth optical signal to pass-through substantially without reflection to the first filter, and for reflecting the second optical signal reflected from the first filter toward the receiver. A third filter may be operatively coupled between the second filter and the receiver, for allowing the second optical signal to pass-through substantially without reflection to the receiver, and for rejecting undesired signals. In one example case, the first and/or third optical signals are digital, and the second and/or fourth optical signals are analog. In another particular case, the second I/O port of the device is operatively coupled to an external digital transceiver. Note that some embodiments may include both the transmitter and receiver, or only the transmitter, or only the receiver, or neither the receiver or the transmitter.

Another embodiment of the present invention provides a method for routing optical signals in a quad-port optical device. The method includes receiving a first optical signal having a first wavelength at a first input/output (I/O) port of the quad-port device, and allowing the first optical signal to pass-through substantially without reflection to a second I/O port of the quad-port device. The method further includes receiving a second optical signal having a second wavelength at the first I/O port, and reflecting the second optical signal at least once within the quad-port device. The method further includes providing a first electrical signal based on the reflected second optical signal to a drop port of the quad-port device, and receiving a second electrical signal at an add port of the quad-port device. The method may include receiving a third optical signal having a third wavelength at the second I/O port, and allowing the third optical signal to pass-through substantially without reflection to the first I/O port. In one such case, the first and/or third optical signals are digital, and the second and/or fourth optical signals are analog. The method may include converting, with a receiver included in the quad-port device, the reflected second optical signal to the first electrical signal, and generating, with a transmitter included in the quad-port device, a fourth optical signal having a fourth wavelength based on the second electrical signal. In one such case, the method further includes reflecting the fourth optical signal at least once within the quad-port device, and providing the reflected fourth optical signal to the first I/O port. In another such case, the method includes bandpass filtering optical signals applied to the receiver.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter

DETAILED DESCRIPTION OF THE INVENTION

Figure 1:
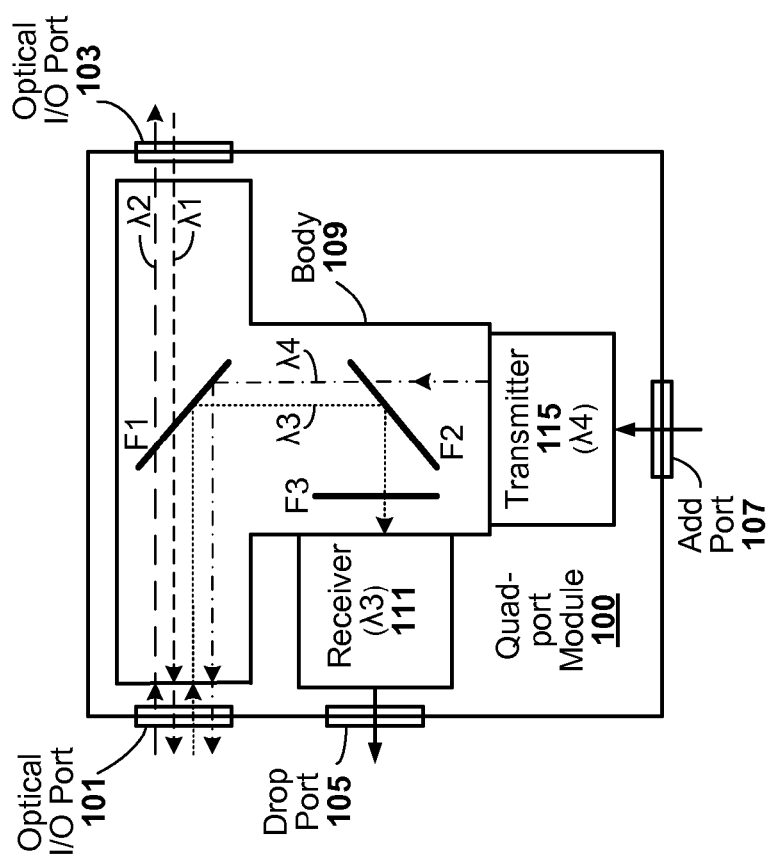
FIG. 1 illustrates architecture and signal flows of a quad-port optical module 100 configured with both module with add-drop and pass-through capability, in accordance with an embodiment of the present invention.

Techniques are disclosed for providing bi-directional data services involving a plurality of wavelengths. The data services may be hybrid in nature, including both digital and analog data signals. The techniques may be implemented, for instance, in an optical module, and allow one or more wavelengths to pass-through while other wavelengths are terminated or otherwise diverted.

In one example embodiment, the techniques are embodied in a quad-port optical module having two input/output (I/O) ports and pass-through capability for at least one of the wavelengths. The module may further include transmit and receive capability and/or be operatively coupled with one or more transceiver modules so as to provide a partial to full complement of transceiver functionality for all signal types or a subset thereof. Example uses for such an optical module include numerous networking applications, such as use in passive optical networks (PON), gigabit PON (GPON), Ethernet PON (EPON), CATV forward/return path, fiber-to-the-home (FTTH) applications, etc. In such applications, the quad-port optical module may be operatively coupled into the network, for instance, for directing optical signals of various wavelengths to appropriate destinations (whether in the upstream or downstream direction) at a service provider's central office, or in a subscriber's home media network, or in a subscriber's office network, or in a multi-dwelling unit.

Thus, a device is provided for routing multiple wavelengths, such that bidirectional optical communication of information encoded in digital and/or analog format is enabled. For instance, a first wavelength (e.g., 1490 nm) can be used to send digital data in a downstream direction from a service provider central office to a subscriber (e.g., media download from a media content Internet-accessible server). A second wavelength (e.g., 1550 nm) can be used to send analog information down the same fiber in the downstream direction (e.g., cable television programming). A third wavelength (e.g., 1310 nm) could be used to carry digital information in the upstream direction from the subscriber to the service provider central office (e.g., media request to purchase and download music or upload of digital music files to online storage facility), and a fourth wavelength (e.g., 1610 nm or 1590 nm) can be used to carry analog information in an upstream direction (e.g., cable subscriber request for pay-per-view selection and purchase). In this way, a communications network is allowed to carry both analog and digital information in its native format (e.g., in an all fiber network, or a so-called hybrid fiber-coax, HFC network).

Because the quad-port optical module provides pass-through capability, it is more than just a terminal device. For instance, such a module can operate as a simple type of optical "add-drop" device, whereby some wavelengths are terminated or "dropped" (i.e., changed from optical signals into electrical signals), while other wavelengths are originated or "added" (i.e., changed from electrical signals into optical signals), and yet other wavelengths simply pass-through without any intentional changes to the signals. For instance, the signals pass-through substantially without reflection, where 5% or less of the signal is reflected. Such a multi-wavelength optical module with add-drop and pass-through capability provides more flexibility to the end-user. For instance, a service provider can initially choose to not offer digital services enabled by bidi optical digital transceiver, but subsequently add these services later merely by plugging or otherwise operatively coupling a bidi optical digital transceiver into a port of an optical module configured with analog transmit-receive capability, in accordance with one embodiment of the present invention. Likewise, subscribers can deploy the multi-wavelength optical module with add-drop and pass-through capability in a home network that includes both digital online services and analog television services. Other commercial advantages and uses associated with the techniques and quad-port optical modules described herein will be apparent in light of this disclosure.

Quad-Port Module Architecture

FIG. 1 illustrates architecture and signal flows of a quad-port optical module 100 configured with both module with add-drop and pass-through capability, in accordance with an embodiment of the present invention.

As can be seen, module 100 includes a main body 109 portion that includes or is otherwise operatively coupled with receiver 111 circuitry and transmitter 115 circuitry. In addition, optical filters F1, F2, and F3 are disposed within the body 109. The module 100 also includes two optical bidirectional I/O ports 101 and 103 that operate in conjunction with filter F1 to provide pass-through capability for wavelengths in a given range (e.g., $\lambda 1$ and $\lambda 2$). The module further includes an electrical receive or "drop" port 105 that operates in conjunction with filters F1, F2, and F3 and receiver 111 to provide drop capability for wavelengths in a given range (e.g., $\lambda 3$). The module further includes an electrical transmit or "add" port 107 that operates in conjunction with filters F1, F2, and F3 and transmitter 115 to provide add capability for wavelengths in a given range (e.g., $\lambda 4$).

The body 109 can be implemented, for example, as a metal housing (e.g., aluminum, steel, or other suitable metal or metal alloy) that includes therein optical passageways for generally routing light (e.g., wavelengths $\lambda 1$, $\lambda 2$, $\lambda 3$ and $\lambda 4$) as shown. The filters F1, F2, and F3 are provided to allow for wavelength-selective routing of the light within the passageways, as will be discussed in turn. Other optical components may also be included in the body 109, such as absorbers to remove stray light and optical lenses and/or coatings to channel and focus the light to a particular location within the module (e.g., to collect the largest possible percentage of light from the transmitter 115, or to deliver the largest possible percentage of light to be incident on a photodiode of the receiver 111). The body 109 can be fabricated, for example, using conventional metal injection molding and/or machining techniques.

In alternative embodiments, the body 109 can be implemented with any suitable materials that can be shaped, formed, or otherwise fabricated to provide suitable optical passageways capable of routing optical signals as described herein. Example alternative materials include plastics, polymers, and metal coated substrates. In one alternative embodiment, the body 109 is made using planar lightwave circuit (PLC) technology or other such waveguide technology. Conventional molding, machining, and/or photolithography (e.g., deposition, masking, and etching) techniques can be employed in fabricating the body 109. The filters F1, F2, and F3 can be integrated directly into the design of the body 109 (e.g., using photolithography to pattern and form the respective filters), or they can be fabricated separately and then installed into the body 109 (e.g., post-fabrication of body 109, or during fabrication of body 109 with in-situ molding process where pre-formed filters are place in mold prior to injection of body 109 material).

In the embodiment shown, filters F1 and F2 are each implemented with a 45 degree thin film optical filter for wavelength routing of the add and drop wavelengths, and filter F3 is implemented with a 0 degree thin film optical filter for drop wavelength selection. Numerous optical filtering schemes will be apparent in light of this disclosure, and the present invention is not intended to be limited to any particular such scheme. Factors such as the angle of incidence will depend on the shape of the body 109 and its optical passageways. Other embodiments may include additional filters (e.g., in the case where the body 109 portion has a more complex shape relative to the T-shape shown), or less filters (e.g., in the case where filter F3 is not used, or is integrated into the circuitry of receiver 111).

In one specific configuration of the embodiment shown, filter F1 is configured to pass all wavelengths below about 1500 nm, and to reflect wavelengths above 1500 nm. Thus, optical signals received at I/O port 101 having a wavelength below 1500 nm are allowed to pass-through filter F1 to I/O port 103, while optical signals received at I/O port 101 having a wavelength above 1500 nm are reflected toward filter F2. Likewise, optical signals received at I/O port 103 having a wavelength below 1500 nm are allowed to pass-through filter F1 to I/O port 101, while optical signals received at I/O port 103 having a wavelength above 1500 nm are reflected toward filter F2. Continuing with this specific example embodiment, filter F2 can be configured to pass all wavelengths above about 1600 nm, and to reflect wavelengths below 1600 nm. Thus, optical signals generated by transmitter 115 having a wavelength above 1600 nm are allowed to pass-through filter F2 to filter F1, while optical signals generated by transmitter 115 having a wavelength below 1600 nm would be reflected toward filter F3. Filter F3 can be configured as a passband filter that passes only wavelengths in the range of a target detection wavelength of receiver 111, which is one specific case is about 1550 nm +/−20%. All other signals would be reflected or otherwise rejected by filter F3. Note that each of the filters F1, F2, and F3 may be associated with one or more transition periods, where the filter is transitioning from transmissive to reflective, or from reflective to transmissive. Thus, the filters F1, F2, and F3 can be designed or otherwise selected so that their respective transition periods are suitable for the intended application.

The transmitter 115 circuitry is configured to receive electrical signals from the add port 107, and to convert those signals to optical signals. The optical signals can then be routed for transmission through filter F2 and reflected by filter F1 toward the I/O port 101. In one example embodiment, transmitter 115 is implemented with a light source (e.g., laser diode, LED, or other suitable light source) and an incoming signal interface. The transmitter 115 circuitry can be implemented, for example, with a 1610 nm analog return path laser. In one such particular embodiment, the incoming signal interface is a radio frequency (RF) interface. The RF interface is adapted for receiving RF signals such as those from a cable TV set-top box or a cable modem, and amplifying or otherwise controlling the amplitude of those signals such that their signal level is appropriate for the light source used. The RF interface may be further configured for translating the RF signals into a form compliant with a particular protocol or modulation scheme and/or processing the RF signals in accordance with a security scheme (e.g., encryption). Any number of suitable transmitter circuits can be implemented here. The incoming signal interface of transmitter 115 is not intended to be limited to RF signals or any specific signal type, and in other embodiments, may operate in numerous signal spectrums or frequency ranges and may be analog or digital in nature. Whether transmitter 115 circuitry is implemented with analog or digital technology will depend on a number of factors, such as the target application for module 100, including the nature of the intended signals to be received at add port 107.

The receiver 111 circuitry is configured to receive optical signals from filter F3, and to convert those signals to electrical signals. The electrical signals can then be routed for transmission through the drop port 105 to a local device or circuit, such as TV, cable TV set-top box, or a cable modem. In one example embodiment, receiver 111 is implemented with a photodetector (e.g., PIN-type or avalanche photodiode, or other suitable light detector) and an outgoing signal interface. The photodetector can be implemented, for example, with a 1550 nm analog PIN photodiode. In one such particular embodiment, the outgoing signal interface is a radio frequency (RF) interface. The RF interface is adapted for receiving electrical signals generated by the light detector, and amplifying or otherwise controlling the amplitude of those signals such that their signal level is appropriate for driving the target device (e.g., set-top box, cable modem, TV, or other intended device). The RF interface may be further configured for translating the electrical signals generated by the photodetector into a form compliant with a particular protocol or modulation scheme and/or processing the electrical signals in accordance with a security scheme (e.g., decryption). The RF interface may include, for example, a trans-impedance amplifier and one or more additional amplification stages such that the RF level of the electrical signals provided by the photodetector is sufficient to drive the target device. Any number of suitable receiver circuits can be implemented here. The outgoing signal interface of receiver 111 is not intended to be limited to RF signals or any specific signal type, and in other embodiments, may operate in numerous signal spectrums or frequency ranges and may be analog or digital in nature. Whether receiver 111 circuitry is implemented with analog or digital technology will depend on a number of factors, such as the target application for module 100, including the nature of the signals expected to be transmitted from drop port 105 (the expectation being from the perspective of the target device).

Figure 2:
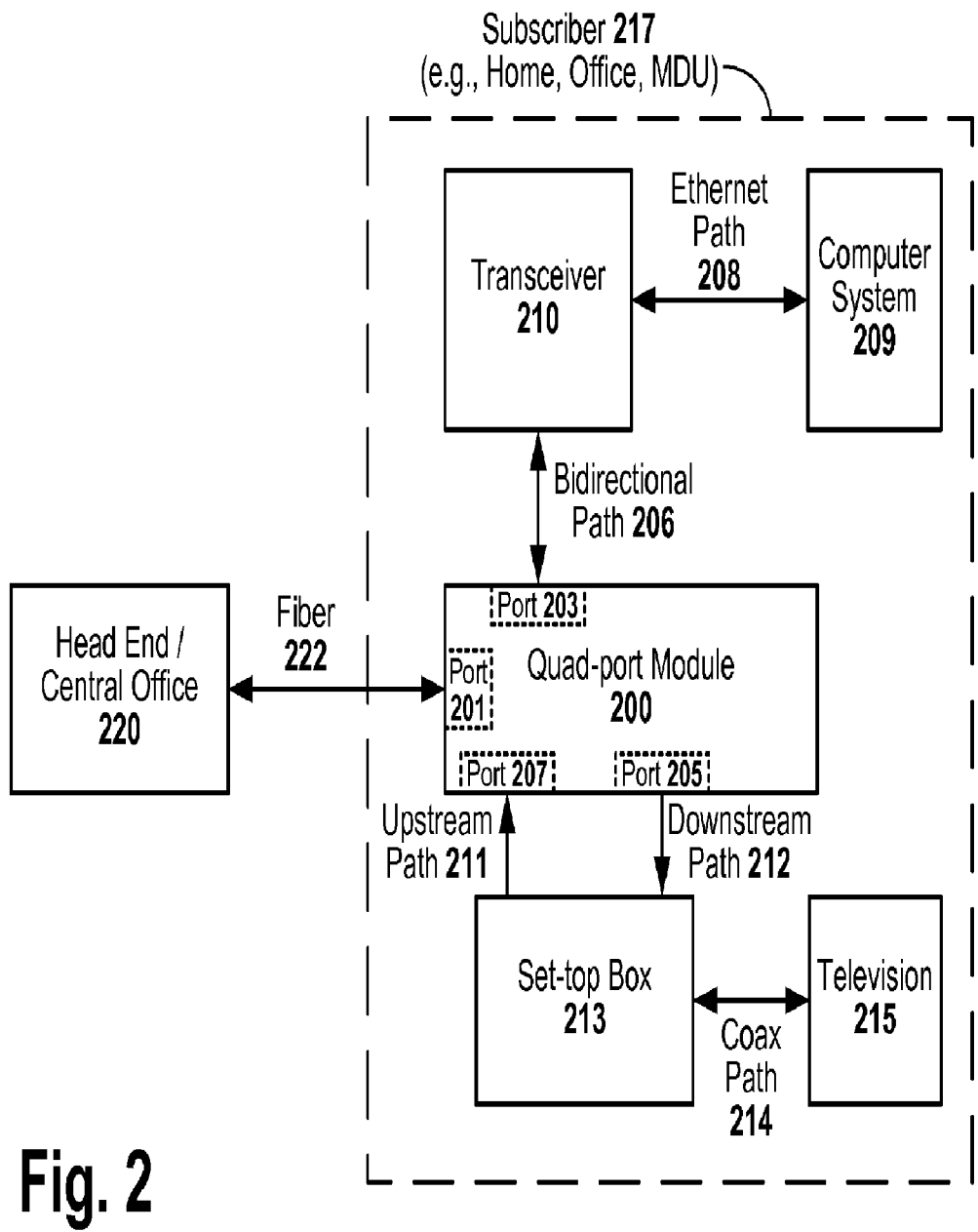
FIG. 2 illustrates a communication system configured with a quad-port optical module having both add-drop and pass-through capability, in accordance with an embodiment of the present invention.

The I/O ports 101 and 103 themselves can be implemented in a number of ways, to facilitate operative coupling to the module 100 (e.g., into a system as shown in FIG. 2). In one particular case, each of the I/O ports 101 and 103 are configured with a standard connector/angled physical contact (SC/APC) receptacle connector. Alternatively, one of the I/O ports can be implemented with an SC/APC receptacle connector and the other I/O port one Lucent connector APC (LC/APC) receptacle connector. Alternatively, one of the I/O ports can be implemented with an SC/APC receptacle connector and the other I/O port one straight tip connector APC (ST/APC) receptacle connector. Other such of configurations can be used as will be apparent in light of this disclosure and with a particular application in mind, and the present invention is not intended to be limited to any particular one or subset of such example configurations.

System Architecture

FIG. 2 illustrates a communication system configured with a quad-port optical module having both add-drop and pass-through capability, in accordance with an embodiment of the present invention.

As can be seen, the system includes a head end or central office 220 communicatively coupled to a subscriber's equipment 217 via a network that includes optical fiber 222. The subscriber's premises includes a quad-port module 200 operatively coupled to a transceiver 210 via a bidirectional path 206. The transceiver 210 is operatively coupled with a computer system 209 via an Ethernet path 208. The quad-port module 200 is also operatively coupled to a set-top box 213 via an upstream path 211 and a downstream path 212. The set-top box 213 is operatively coupled to a television 215 via coaxial (coax) path 214. The head end/central office 220 may be, for example, a cable service provider that provides media and Internet services in digital and/or analog format, and the subscriber may be, for example, a residential home or office or multi-dwelling unit (MDU) that subscribes to the various services provided by the cable service provider.

The head end/central office 220 can generally be implemented as typically done, and its network may be, for example, a fiber network or an HFC network that includes both coaxial and fiber cable portions. In this example embodiment, a fiber-to-the-home (FTTH) configuration is shown, where fiber 222 is provided directly to the subscriber premises 217. Other configurations will be apparent in light of this disclosure. For instance, fiber 222 may be a coax cable that is operatively coupled to an optical transceiver included in the subscriber premises 217, wherein the optical transceiver converts downstream electrical signals received from coax 222 into optical signals that can then be provided to the quad-port module, and further converts upstream optical signals to electrical signals that can then be provided to the head end/central office 220 via coax 222. In one example configuration, the head end/central office 220 includes a multiplexer and demultiplexer operatively coupled to fiber 222, so as to allow multiple wavelengths to be communicated over the fiber 222 (e.g., multiplexing of $\lambda 2$ and $\lambda 3$ onto fiber 222), as well as recovery of the individual wavelengths at the head end/central office 220 demultiplexing of $\lambda 1$ and $\lambda 4$ from fiber 222).

The quad-port module 200 can generally be implemented as shown in FIG. 1. The module 200 may be used to process all digital signals, all analog signals, or both analog and digital signals. In any such cases, the module 200 includes two optical I/O ports that provide pass-through capability, an electrical port that provides drop capability, and a transmit port that provides add capability. The type of signals (analog or digital) that are passed through, dropped, and added will depend on the particular application at hand, and the present invention is not intended to be limited to any particular one or set of applications. One specific example embodiment of the quad-port module 200, where digital signals are passed through, and analog signals are added/dropped, will be discussed in turn with reference to FIG. 3. Other embodiments may be reversed (analog signals are passed through and digital signals are added/dropped). Still other embodiments may pass-through and add/drop only one type of signal.

The transceiver 210 can be implemented with conventional technology as well, and may be, for example, an analog cable modem or a digital SFF or SFP bidi transmit-receive device (recall that SFF stands for small form factor and SFP stands for small form-factor pluggable). The path 206 can be implemented to suit the nature of the signals being communicated between transceiver 210 and port 203 of module 200. In one example embodiment, and as will be discussed in more detail with reference to FIG. 3, transceiver 210 is a digital transceiver and path 206 is implemented with fiber and standard optical connectors or an optical waveguide. Computer system 209 can be any conventional processing system (e.g., desktop, laptop, server, personal digital assistant, or other suitable processing system) and communicates with transceiver 210 over a conventional Ethernet path 208, which can be analog or digital to suit a given application.

The set-top box 213 can be implemented as conventionally done, and may communicate in analog format, digital format or both formats (e.g., user-configurable). The upstream path 211 and downstream path 212 can each be implemented to suit the nature of the signals being communicated between set-top box 213 and ports 207 and 205 (respectively) of module 200. In one example embodiment, and as will be discussed in more detail with reference to FIG. 3, set-top box 213 communicates in an analog format and paths 211 and 212 are implemented with coax and standard connectors or a run on a printed circuit board. Television 215 can be any conventional television (e.g., CRT, flat-panel, projection, or other suitable display device) and communicates with set-top box 213 over a coax path 214, which can be analog or digital to suit a given application.

Analog Optical Quad-Port Module with Digital Bidi Coupling

Figure 3:
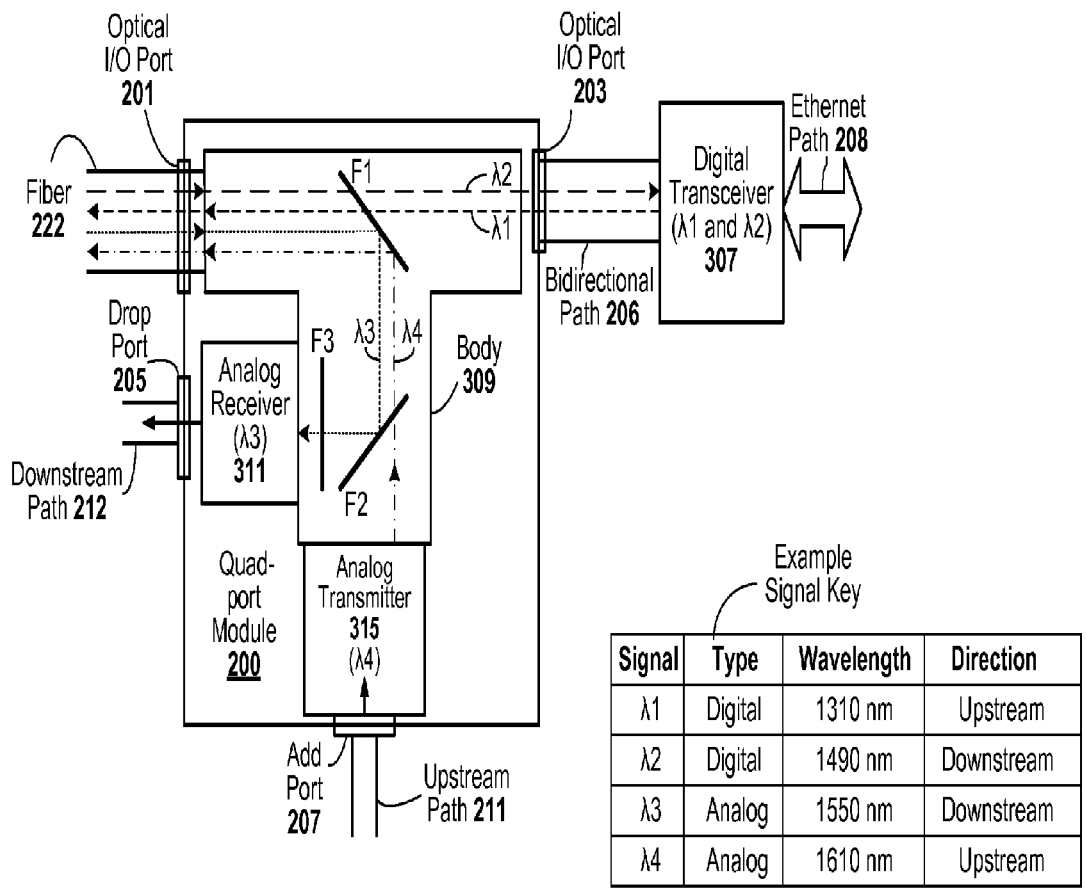
FIG. 3 illustrates a detailed view of the quad-port optical module shown in FIG. 2, and signal flows therein, in accordance with one specific example embodiment of the present invention.

FIG. 3 illustrates a detailed view of the quad-port optical module shown in FIG. 2, and signal flows therein, in accordance with one specific example embodiment of the present invention.

As can be seen, this example configuration of quad-port module 200 includes a body 309 portion that includes or is otherwise operatively coupled with analog receiver 311 circuitry and analog transmitter 315 circuitry. In addition, optical filters F1, F2, and F3 are disposed within the body 309. The module 200 also includes two optical bidirectional I/O ports 201 and 203 that operate in conjunction with filter F1 to provide pass-through capability for wavelengths in a given range (e.g., $\lambda 1$ and $\lambda 2$). The module further includes drop port 205 that operates in conjunction with filters F1, F2, and F3 and receiver 311 to provide drop capability for wavelengths in a given range (e.g., $\lambda 3$). The module 200 further includes an add port 207 that operates in conjunction with filters F1, F2, and F3 and transmitter 315 to provide add capability for wavelengths in a given range (e.g., $\lambda 4$).

The previous discussion with reference to FIG. 1, including components and functionality, as well as various configurations, materials and fabrication techniques, associated with module 100, is equally applicable here to module 200. However, note that this example configuration includes the optical devices necessary to transmit and receive analog information (analog receiver 311 and analog transmitter 315). A separate digital transceiver 307 is operatively coupled to the I/O port 203 of the module 200, as shown in FIG. 3. In this sense, the quad-port module 200 is modular, in that it includes componentry necessary to transmit and receive a first type of information (analog in this example) and allows for operative coupling with other componentry necessary to transmit and receive a second type of information (digital in this example). Thus, a modular four-wavelength optical device having a full complement of analog and digital transmit-receive functionality is provided.

The I/O ports 201 and 203 of this example embodiment are each configured with a SC/APC receptacle connector. In addition, the digital transceiver 307 is implemented with a digital GPON/EPON bidi SFF or SFP bidi transmit-receive device, although any number of suitable optical network terminations (ONT) or optical network units (ONU) can be used here, as will be appreciated in light of this disclosure. With further reference to FIG. 3, an example signal key is provided, which indicates the type, wavelength, and direction of each of the four wavelengths being processed by module 300. Signal λ1 is an upstream digital signal having a wavelength of 1310 nm. Signal λ2 is a downstream digital signal having a wavelength of 1490 nm. Signal λ3 is a downstream analog signal having a wavelength of 1550 nm. Signal λ4 is an upstream analog signal having a wavelength of 1610 nm. Recall that upstream and downstream are generally used with reference to a central office or head end operated by a service provider (e.g., telephone or cable company).

The specification for the filters F1, F2, and F3 for this specific embodiment are found in Table 1. In particular, Table 1 shows example transmission and reflection characteristics of each filter.

TABLE 1

Filter Design Specifications

| Parameter | Filter | | |
|---|---|---|---|
| | F1 | F2 | F3 |
| Transmission Characteristics | | | |
| Angle of Incidence (degrees) | 45 | 45 | 0-8 |
| Passband (nm) | <1510 short pass (≧97% T) | >1580 long pass (≧97% T) | 1550 ± 10 (≧97% T) |
| Insertion Loss (dB) | ≦0.3 | ≦0.3 | ≦0.3 |
| Reflect Band Isolation (dB) | ≧25 | ≧25 | ≧25 |
| PDL (dB) | ≦0.2 | ≦0.2 | ≦0.2 |
| Reflection Characteristics | | | |
| Reflection band (nm) | >1530 long pass | 1550 ± 10 | <1540 and >1560 |
| Insertion Loss (dB) | ≦0.3 | ≦0.3 | ≦0.3 |
| Reflection Isolation (dB) | ≧25 | ≧25 | ≧25 |
| PDL (dB) | ≦0.2 | ≦0.2 | ≦0.2 |

The analog receiver 311 of this specific example embodiment includes a 1550 nm analog PIN photodiode. The detailed specifications, including both electrical and optical characteristics, for this example receiver 311 are shown in Table 2. Parameters are at about 25° C. unless otherwise noted.

TABLE 2

Electrical and Optical Characteristics of Receiver

| Parameter | Symbol | Condition | Min | Typ. | Max. | Unit |
|---|---|---|---|---|---|---|
| Input Wavelength | λpd | Tc = 25° C. | 1540 | 1550 | 1560 | nm |
| Responsivity | R | Tc = −10~+65° C. | 0.8 | — | — | A/W |
| Capacitance | Cpd | Vr = 10 V, f = 1 MHZ, Popt = 0 uW | — | — | 0.8 | pF |
| Dark Current | Id | Vr = 10 V, Popt = 0 uW | — | — | 5 | nA |
| Second Order Inter-Modulation Distortion | IMD2 | λ = 1550 nm (*1), Vpd = 12 V | — | — | −70 | dBc |
| Composite Triple Beat | IMD3 | λ = 1550 nm (*1), Vpd = 12 V | — | — | | |
| Optical Return Loss | ORL | λ = 1540 nm-1560 nm, | 35 | — | — | dB |
| Polarization Dependent Loss | PDL | | | | 0.5 | dB |
| Optical Isolation from External Source | ISO1 | λ = 1260 nm-1360 nm | 22 | — | — | dB |
| | ISO2 | λ = 1480 nm-1500 nm | 26 | — | — | dB |
| Optical Crosstalk from Internal LASER | Xopt | (*2) | — | — | −30 | dB |

Notes *1 and *2 are indicated at various locations in Table 2, and each note is explained here.
Note *1:
two tone two laser test (f1 = 109.25 MHz, f2 = 349.25 MHz, f3 = 439.25 MHz), OMI = 40%, 0.5 mW per laser.
Note *2:
Xopt = 10 × log{(Ixopt/R)/Pf}, wherein Ixopt is photo current at Pf = 3 dBm.

The analog transmitter 315 of this specific example embodiment includes a 1610 nm analog return path distributed feed-back (DFB) laser transmitter. The detailed specifications, including both electrical and optical characteristics, for this example transmitter 315 are shown in Table 3. Parameters are at about 25° C. unless otherwise noted.

TABLE 3

Electrical and Optical Characteristics of Transmitter

| Parameter | Symbol | Min. | Typ. | Max. | Unit | Note |
|---|---|---|---|---|---|---|
| Center Wavelength | λ | 1600 | 1610 | 1620 | nm | — |
| Spectral Width | Δλ | — | — | 1 | nm | |
| Output Power | Po | −3 | +2 | +4.8 | dBm | Tc = −10° C.~+65° C. |

TABLE 3-continued

Electrical and Optical Characteristics of Transmitter

| Parameter | Symbol | Min. | Typ. | Max. | Unit | Note |
|---|---|---|---|---|---|---|
| Output Power Tracking Error | TE | −1.0 | — | 1.0 | dB | — |
| Operation Voltage, BOL to EOL | Vop | 1.0 | 1.2 | 1.6 | V | Measure at maximum Po |
| Threshold Current, BOL to EOL | Ith | 0.5 | — | 60 | mA | Over temperature range |
| Slope Efficiency | Se | 0.025 | — | 0.15 | W/A | Tc = −10° C.~+65° C. |
| Differential Series Resistance | Rs | 2 | — | 10 | ohm | — |
| Monitor Diode Current | Im | 80 | — | 1000 | uA | Popt = 2 mW, Vr = 5 V |
| Monitor Dark Current | Imd | — | — | 1000 | nA | Popt = 0 mW, Vr = 5 V |
| Monitor PD Terminal Capacitance | Ct | — | — | 20 | pF | At Vr = 5 V at f = 1 MHz |

Numerous receiver and transmitter circuits can be used to implement the receiver 311 and transmitter 315, respectively, and the present invention is not intended to be limited to any particular configuration. For instance, any transmitter circuit capable of converting electrical signals received at the add port 207 to optical signals, and driving those optical signals onto the optical passageway of module 200 can be used. Likewise, any receiver circuit capable of converting optical signals received from filter F3 to electrical signals, and driving those electrical signals out drop port 205 of module 200 and on to the downstream local path 212 to an intended local device, can be used. Note that the word "circuit" or "circuitry" as used herein may be implemented, for example, with components operatively coupled to a printed circuit board, or with a modular component (e.g., TO-can or integrated circuit or chip set) that includes coupling means such as wires or pins that can connect to other circuitry external to the quad-port module, or simply a functional component (e.g., laser diode or photodiode) that is operatively coupled into the quad-port module.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A quad-port optical device, comprising:
a first input/output (I/O) port for receiving a first optical signal having a first wavelength, and for receiving a second optical signal having a second wavelength;
a second I/O port;
a first filter operatively coupled between the first and second I/O ports, for allowing the first optical signal to pass-through substantially without reflection to the second I/O port, and for reflecting the second optical signal;
a receiver for converting the reflected second optical signal to a first electrical signal;
a drop port for outputting the first electrical signal; and
an add port for receiving a second electrical signal.

2. The device of claim 1 wherein the second I/O port is for receiving a third optical signal having a third wavelength, and the first filter is further configured for allowing the third optical signal to pass-through substantially without reflection to the first I/O port.

3. The device of claim 1 further comprising:
a transmitter for generating a fourth optical signal having a fourth wavelength based on the second electrical signal, wherein the fourth optical signal reflects off the first filter and is provided to the first I/O port.

4. The device of claim 3 further comprising:
a second filter operatively coupled between the first filter and the transmitter, for allowing the fourth optical signal to pass-through substantially without reflection to the first filter, and for reflecting the second optical signal reflected from the first filter toward the receiver.

5. The device of claim 4 further comprising:
a third filter operatively coupled between the second filter and the receiver, for allowing the second optical signal to pass-through substantially without reflection to the receiver, and for rejecting undesired signals.

6. The device of claim 3 wherein the first optical signal is digital, and the fourth optical signal is analog.

7. The device of claim 1 wherein the first optical signal is digital, and the second optical signal is analog.

8. The device of claim 1 wherein the second I/O port of the device is operatively coupled to an external digital transceiver.

9. A quad-port optical device, comprising:
a first input/output (I/O) port for receiving a first optical signal having a first wavelength, and for receiving a second optical signal having a second wavelength;
a second I/O port;
a first filter operatively coupled between the first and second I/O ports, for allowing the first optical signal to pass-through substantially without reflection to the second I/O port, and for reflecting the second optical signal;
a receiver for converting the reflected second optical signal to a first electrical signal;
a drop port for outputting the first electrical signal;
an add port for receiving a second electrical signal;
a transmitter for generating a fourth optical signal having a fourth wavelength based on the second electrical signal, wherein the fourth optical signal reflects off the first filter and is provided to the first I/O port; and
a second filter operatively coupled between the first filter and the transmitter, for allowing the fourth optical signal to pass-through substantially without reflection to the first filter, and for reflecting the second optical signal reflected from the first filter toward the receiver.

10. The device of claim 9 wherein the second I/O port is for receiving a third optical signal having a third wavelength, and the first filter is further configured for allowing the third optical signal to pass-through substantially without reflection to the first I/O port.

11. The device of claim 9 further comprising:
a third filter operatively coupled between the second filter and the receiver, for allowing the second optical signal to pass-through substantially without reflection to the receiver, and for rejecting undesired signals.

12. The device of claim 9 wherein the first optical signal is digital, and the second and fourth optical signals are analog.

13. The device of claim 12 wherein the second I/O port of the device is operatively coupled to an external digital transceiver.

14. A method for routing optical signals in a quad-port optical device, comprising:
receiving a first optical signal having a first wavelength at a first input/output (I/O) port of the quad-port device;
allowing the first optical signal to pass-through substantially without reflection to a second I/O port of the quad-port device;
receiving a second optical signal having a second wavelength at the first I/O port;
reflecting the second optical signal at least once within the quad-port device;
providing a first electrical signal based on the reflected second optical signal to a drop port of the quad-port device; and
receiving a second electrical signal at an add port of the quad-port device.

15. The method of claim 14 further comprising:
receiving a third optical signal having a third wavelength at the second I/O port; and
allowing the third optical signal to pass-through substantially without reflection to the first I/O port.

16. The method of claim 15 wherein the first and third optical signals are digital, and the second optical signal is analog.

17. The method of claim 14 further comprising:
converting, with a receiver included in the quad-port device, the reflected second optical signal to the first electrical signal; and
generating, with a transmitter included in the quad-port device, a fourth optical signal having a fourth wavelength based on the second electrical signal;
reflecting the fourth optical signal at least once within the quad-port device; and
providing the reflected fourth optical signal to the first I/O port.

18. The method of claim 17 further comprising:
bandpass filtering optical signals applied to the receiver.

19. The method of claim 14 wherein the first optical signal is digital, and the second optical signal is analog.

20. The method of claim 14 wherein the second I/O port of the device is operatively coupled to an external digital transceiver.

* * * * *